United States Patent [19]

Foret

[11] Patent Number: 4,836,973

[45] Date of Patent: Jun. 6, 1989

[54] METHOD OF DETERMINING THE ALARM THRESHOLD OF THE OVER-HEATING RATIO, A DEVICE FOR IMPLEMENTING THE METHOD, AND A METHOD OF CONTROLLING A NUCLEAR REACTOR

[75] Inventor: Francois Foret, Courbevoie, France

[73] Assignee: Framatome, Courebevoie, France

[21] Appl. No.: 150,269

[22] Filed: Jan. 29, 1988

[30] Foreign Application Priority Data

Jan. 30, 1987 [FR] France .................. 87 01162

[51] Int. Cl.⁴ .................................... G21C 7/36
[52] U.S. Cl. ........................ 376/216; 376/215
[58] Field of Search ..................... 376/215, 216

[56] References Cited

U.S. PATENT DOCUMENTS

| | | | |
|---|---|---|---|
| 3,998,693 | 12/1976 | Musick | 376/216 |
| 4,075,059 | 2/1978 | Bruno | 376/216 |
| 4,080,251 | 3/1978 | Musick | 376/216 |
| 4,318,778 | 3/1982 | Musick | 376/216 |
| 4,330,367 | 5/1982 | Musick | 376/245 |
| 4,699,749 | 10/1987 | McAtee | 376/216 |
| 4,710,341 | 12/1987 | Bernard | 376/216 |
| 4,711,753 | 12/1987 | Impink | 376/216 |
| 4,738,818 | 4/1988 | Cantineau | 376/211 |

FOREIGN PATENT DOCUMENTS 0100640 2/1984 European Pat. Off. .
0188918 7/1986 European Pat. Off. .

OTHER PUBLICATIONS

Siemens–Zeitschrift, vol. 49, No. 10, Oct. 1975, pp. 652–657; H.–W. Bock et al, "Reaktorleistungsregelung mit Doppelprozessrechner 305 im Kernkraftwerk Stade", p. 652, paragraph 4–page end.

Primary Examiner—Donald P. Walsh
Attorney, Agent, or Firm—Sughrue, Mion, Zinn, Macpeak & Seas

[57] ABSTRACT

The low alarm threshold (B) of the overheating ratio of a nuclear reactor is determined in such a manner that the higher the position of the temperature-regulating rods, the lower the value determined for said threshold. The invention is applicable, in particular, to pressurized water nuclear reactors used for producing electrical power.

5 Claims, 1 Drawing Sheet

METHOD OF DETERMINING THE ALARM THRESHOLD OF THE OVER-HEATING RATIO, A DEVICE FOR IMPLEMENTING THE METHOD, AND A METHOD OF CONTROLLING A NUCLEAR REACTOR

The present invention relates to controlling a nuclear reactor. It applies to pressurized water fission reactors whose control and regulation are provided by means of different families of control rods.

BACKGROUND OF THE INVENTION

Such a reactor comprises the following known elements:

a core containing reactive fuel elements for fuelling a nuclear fission reaction which creates a neutron flux in the volume of the core, said reaction itself being engendered in each zone of said volume by the neutron flux existing in said zone, and generating nuclear power in the form of heat which varies with said flux;

a coolant circuit having one branch passing through said core to remove said power and to enable it to be used in a variable load outside the reactor;

measuring means for measuring, in particular, the temperatures of said coolant in order to provide firstly an overheating ratio representative of the ratio of a predetermined critical heat flux which would be severely damaging at whatever point it occurs in the core, to a real local heat flux at a hot point where said flux is at a maximum, and also to provide an average temperature of the coolant which should be close to a normal value in order to enable the station to operate optimally; and control rods provided with displacement means and with control means for inserting and extracting said rods longitudinally into corresponding zones of the core thereby controlling the positions of said rods, the position of a rod being defined by its extraction percentage.

Each of said rods includes a neutron-absorbing material distributed along its length and conferring negative reactivity thereto which diminishes said neutron flux and said nuclear power in the corresponding zone of the core over the depth to which the rod is inserted in such a manner as to enable displacement of said rods to vary the nuclear power of the core at the expense of distortions which appear in the distribution of the neutron flux and which give rise to additional wear of the core.

One family of these control rods is constituted by fine control rods capable of being displaced during normal control operations over a great height in order to cause the nuclear power to follow large variations which occur relatively infrequently in said external load.

Another family of the control rods is constituted by regulator rods, said rod control means receiving the average temperature of the coolant and reducing or increasing the extraction percentage of the regulator rods depending on whether said temperature is respectively greater than or less than its said normal value, thereby constituting a regulation loop which automatically maintains said average temperature in the vicinity of said normal value by causing the nuclear power to follow small variations which frequently affect said external load and which would cause said temperature to vary if the nuclear power were constant, said control means limiting the displacement of said regulation rods in normal operation to within a regulation range which is defined between two high extraction percentages so as to limit wear on the core by limiting the amplitudes of the distortions which such rod displacements frequently impose on the neutron flux.

One known method of controlling such a reactor comprises not only the displacement of the fine control rods during said normal control operations in order to cause the nuclear power to follow major changes in the external load, but also possible additional insertion of said rods during an operation to reduce power on an alarm which occurs as soon as said overheating ratio falls below a low alarm threshold such as to raise said ratio at least as far as said threshold, said threshold being determined with a safety margin sufficiently greater than unity to ensure that on being reached, said overheating cannot be approached in a dangerous manner, even in the event that certain accidents studied in advance may occur;

In this known method, the low alarm threshold of the overheating ratio is set at 2.17. Unfortunately, relatively short and unavoidable fluctuations appear from time to time in the operation of a reactor. They oblige the station operator to reduce reactor power too often by inserting fine control rods to bring the ratio back over the threshold, even though the average temperature of the coolant would allow operation at higher power. As a result the power available for delivering to the external load is reduced. The load is generally a turbine alternator set feeding electricity distribution mains. Such power reductions give rise, in the end, to a substantial reduction in the availability of the power station for producing electricity.

A particular aim of the present invention is to reduce the number of power reductions that may be caused by fluctuations affecting the overheating ratio in a manner which is simple and cheap, and without running any risks of danger due to local overheating in the reactor core.

The invention also aims to increase the availability, the profitability and the average power of a nuclear power station.

SUMMARY OF THE INVENTION

In the method of control in accordance with the invention, different values for said low alarm threshold of the overheating ratio are chosen for different positions of the regulation rods within said regulation range: a relatively high value is selected when the extraction percentage of said rods is relatively low. In contrast, a relatively low value is selected when the said percentage is relatively high. This avoids reducing the nuclear power and thus of the power deliverable to said external load when the overheating ratio falls between said two threshold values while the positions of the regulation bars are such that such reduction is unnecessary. More precisely, this is a position such that in the event of one of the above-mentioned accidents being studied in advance occuring, a suitable displacement of said bars within said regulation range, would suffice to avoid any risk of said overheating being approached in said dangerous manner.

In accordance with the invention, the low alarm threshold is preferably determined automatically within a control assisting device. A circuit therefrom receives data constituted by the percentage extraction of the regulation rods, and it permanently supplies the station operator with the value of the low alarm threshold as determined thereby in the form of a predetermined, and generally decreasing function of said percentage.

The present invention also provides said device and the method of determination implemented thereby.

BRIEF DESCRIPTION OF THE DRAWINGS

A particular implementation of the invention within the scope of the above definition is described in greater detail below by way of non-limiting example and with reference to the accompanying diagrammatic figures. When the same item is shown in several of the figures it is designated therein by the same reference sign.

MORE DETAILED DESCRIPTION

Figure 1:
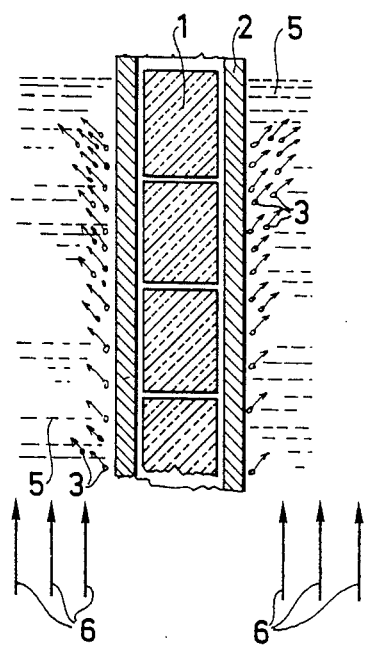
FIG. 1 is an axial section through a fuel element in contact with the water which constitutes the coolant in the core of a pressurized water nuclear reactor as it approaches overheating.
Figure 2:
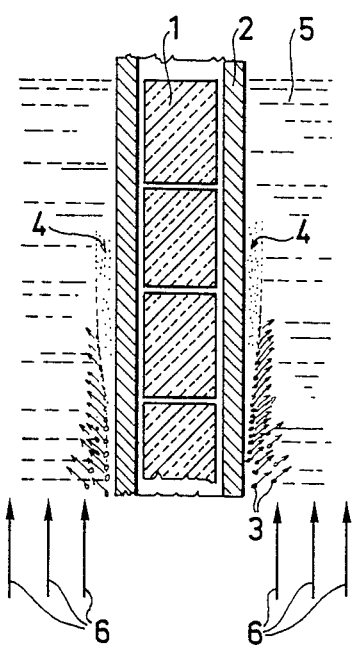
FIG. 2 is a similar view of the same element in the presence of overheating.

As mentioned above, the overheating ratio is equal to the ratio of a critical heat flux to the local heat flux at the hot point. Said critical heat flux is the amount of heat flux that will cause said coolant, i.e. the water flowing in the primary circuit and constituting the primary cooling fluid, to pass from the beginning of boiling to complete boiling and to form a film of steam. In FIGS. 1 and 2, arrows such as 6 show the direction of displacement of said water 5 where it comes into contact with protective sheaths such as 2. These sheaths are made of a zirconium alloy. They contain the rods such as 1 which constitute the fuel elements.

The over-heating phenomenon under consideration appears around one or more of these fuel rods. It is characterized by the formation of bubbles of steam 3 around the sheath 2 of a rod 1 as shown in FIG. 1. If heating continues, the formation of bubbles of steam 3 accelerates and forms, as shown in FIG. 2, a film of steam 4 which isolates all or a portion of the sheath from the cooling liquid 5 and which reduces the heat exchange effect. This phenomenon is associated with an increase in the average temperature of the primary fluid. It is dangerous, since an insufficiently cooled sheath is in danger of heating to temperatures greater than 800° C., which would cause it to become fragile.

That is to say if the heat flux reaches the critical value there may be very serious damage to the reactor core, such as partial or total melting thereof. It is therefore essential to be fully informed on this overheating ratio.

The value of the critical heat flux is determined by calculation as a function of the pressure in the reactor, the primary fluid flow rate, and the thermodynamic state of the system.

The local heat flux at the hot point is determined from local temperature values, which values are themselves determined from the temperatures of the hot and cold branches of the primary circuit, from the pressure in said circuit, from the nuclear power as measured by measurement chambers outside said core, and from the position of the control rods.

The problem is to ensure safety, i.e. to avoid any risk of the fuel cladding deteriorating while reducing the reactor power as rarely as possible, in particular when the power is at high values.

More precisely, when a nuclear reactor is constructed and used, arrangements are made to ensure that the overheating ratio never drops below a first predetermined value which is greater than a ratio which constitutes an emergency stop threshold. This threshold is a bottom limit below which the reactor core runs a high risk of being damaged.

A second predetermined value, greater than the first is a low alarm threshold and the overheating ratio must be returned rapidly above this second value should it ever be transgressed.

If this ratio is less than said second value, the operator running the reactor must act on various parameters so as to raise this ratio above said second value. This value is determined so as to provide a sufficient safety margin in the event that an accident occurs such as those mentioned below:

one or more of the clusters each constituted by an assembly of several control rods may fall accidentally, said clusters being fine control clusters or regulation clusters depending on the bars constituting them;

the total removal of such a control cluster; or a break in the steam pipework.

These accidents constitute the above-mentioned accidents studied in advance.

They can reduce the value of the overheating ratio. The risks associated with such reduction are a function of the negative reactivity of the clusters present in the core when an incident occurs.

Automatic power regulators ensure that when a regulator cluster falls accidentally, other clusters are extracted from the core of the reactor, and this may reduce the overheating ratio under the combined effect of the radial deformation and of axial deformation of the neutron flux.

When a control cluster is removed from the reactor core, the average power increase associated with the radial flux deformation increases the local heat flux up to the hot point, thereby reducing the overheating ratio.

Another case is that of a break in the steam pipework, in the secondary circuit which receives heat from the primary circuit containing the above-mentioned coolant, via a steam generator. In this case, if the reactor is under power, the loss of steam to the atmosphere causes the primary circuit to be cooled very rapidly by heat extraction in the steam generator. This temperature drop is followed by control clusters being extracted under the control of instructions given by the regulator equipment in order to increase core reactivity, and consequently to increase its temperature. In this case, extracting the regulator clusters gives rise to axial deformation of the neutron flux which causes the increase in reactivity along the fuel rods to give rise locally, at a certain height in the core, to an increase in the local heat flux in spite of the general cooling of the coolant fluid of the primary circuit. This increase reduces the overheating ratio. In the above case, an emergency stop of the reactor is caused by variations in other parameters.

The value of the alarm threshold is set so that the reduction in the overheating ratio which appears during such accidents does not run the risk of danger to fuel integrity.

Figure 3:
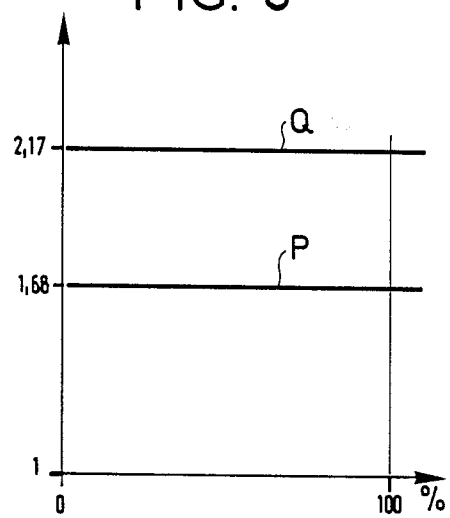
FIG. 3 is a graph showing the values of a low alarm threshold and of an emergency stop threshold as applied to the overheating ratio in the same reactor using a known method, plotted as a function of the extraction percentage of the regulator rods.

FIG. 3 shows values P and Q of the overheating ratio which constitute the emergency stop threshold and the low alarm threshold in the above-mentioned prior art control method. These values are constant as a function of the extraction percentage of the regulator clusters which may vary from 0% to 100%. (At 0%, the clusters are fully inserted into the core, and at 100% they are fully extracted therefrom).

The value P=1.68 for the overheating ratio is the emergency stop threshold value below which the reactor must necessarily be stopped. It is determined by taking account of the inaccuracies in the calculations for determining the critical flux, and a safety margin is added thereto in order to take account of bending in the fuel rods and of inaccuracies in the measurement chains of the automatic emergency stop system.

The value Q=2.17 is chosen by adding to the emergency stop threshold the maximum variation in the overheating ratio which is likely to occur during the above-described accidents studied in advance, and then adding a new safety margin corresponding to the inaccuracy of the measurement chains other than those of the emergency stop system.

This value of the alarm threshold is thus determined independently of the positions of the control clusters. The operators running the station have firm instructions to keep the overheating ratio above this constant value. For example, if the nuclear boiler is operating at 100% of its power, the operators must reduce the power in order to raise the value of the overheating ratio.

I.e., as mentioned above, one of the means used in the prior art control method for raising the value of the ratio over the low alarm threshold when transgressed consists in reducing the power of the reactor. The power reduction is obtained by inserting fine control rods into the reactor core. The same means is used in accordance with the invention.

Unfortunately, the power reduction compared with the design power of the station reduces the availability thereof and can give rise to damaging loss of production if it occurs frequently.

In accordance with the present invention it has been discovered that the value of the overheating ratio can remain for extended periods of time below the prior art constant low alarm threshold without giving rise to a dangerous situation for the reactor core, in particular when the regulation clusters are in the top of the core. That is why, in order to avoid loss of production as much as possible, the invention provides for the low alarm threshold value to be determined as a function of the position of the temperature regulating rods in the core of the reactor. The higher the proportion of these rods that is extracted, the lower the value of the alarm threshold of the overheating ratio. More precisely, an automatic device varies the value of the low alarm threshold of the overheating ratio as a function of the position of the regulation clusters, and the temperature of the primary fluid.

The alarm threshold is still related to the maximum variation of the overheating ratio during one of the above-mentioned accidents studied in advance, however, account is also taken of the positions of the regulation clusters.

Figure 4:
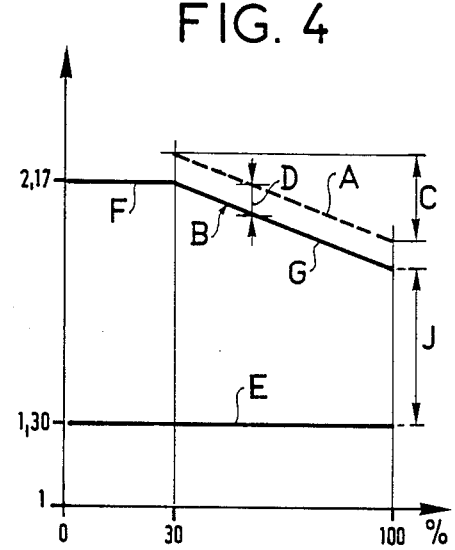
FIG. 4 is a graph of the values of the same thresholds in accordance with the invention.

The variation in the alarm threshold as a function of the positions of the temperature-regulating clusters is given, by way of example, by curve B in FIG. 4. A first length F of this curve gives a low alarm threshold of the overheating ratio which remains equal to 2.17, so long as the extraction percentage remains less than 30%. At more than 30%, the threshold decreases linearly with the percentage along a second length G of the curve. When the temperature-regulating clusters are fully extracted, the threshold value is at a minimum, thereby providing a substantial operating margin.

The event of an accident such as one of the clusters being dropped, is now examined.

The sets of clusters are positioned in the core, for example, so that the reactor power is at 100%. The temperature-regulating clusters are inserted, for example, to 70% of the height of the core, which corresponds to an extraction percentage of 30%, and to an overall negative reactivity which is considerably greater than that for any individual cluster, which is always less than 180 pcm (parts per hundred thousand).

When a cluster falls by accident (assuming that it is not a regulation cluster), the temperature-regulating clusters re automatically moved upwardly through the core together so as to maintain its temperature to a set value. As a result, the local heat flux increases, and the overheating ratio decreases along a curve A parallel to curve B.

The overheating ratio is reduced by two cumulative effects. It is reduced firstly by a quantity related to the axial deformation of the neutron flux having a maximum value which corresponds to withdrawing the regulation clusters from their initial positions to complete withdrawal (100%). This maximum value depends on said initial position. It is zero if said initial position corresponds to 100% extraction. In the expected case of said initial position corresponding to 30% extraction, said maximum value is shown at C.

The overheating ratio also reduces by a constant value J which corresponds to the radial deformation of the flux due to the presence of the dropped cluster in the core, regardless of the positions of the other clusters. The overall reduction in the overheating ratio varies with the initial positions of the groups of regulating clusters, and in any case never causes the ratio to go below a value of 1.30 which corresponds to the curve E and which, in the present nuclear reactor, constitutes the absolute critical threshold which must never be transgressed in order to preserve the integrity of the core.

It can be seen on FIG. 4 that, in some cases, the value of the overheating ratio would go below the alarm threshold if the alarm threshold remained at the constant value of 2.17 which applies to the left-hand length F of the curve B.

However, the variation in the threshold allow the ratio to avoid going below the threshold in these cases. It therefore prevents the operator from having reduce the power of the reactor unnecessarily in order to keep within the operating conditions laid down.

In any event, the reduction in the overheating ratio does not endanger the integrity of the core so long as said ratio remains above the alarm threshold determined in this manner.

Reference D designates an additional safety margin which can be maintained for said ratio in the case of the reactor described.

I claim:

1. A method of controlling the reactor of a nuclear power station by means of a plurality of families of control rods, such a reactor comprising:
    a core containing reactive fuel elements for fuelling a nuclear fission reaction which creates a neutron flux in the volume of the core, said reaction itself being engendered in each zone of said volume by the neutron flux existing in said zone, and generating nuclear power in the form of heat which varies with said flux;

a coolant circuit having one branch passing through said core to remove said power and to enable it to be used in a variable load outside the reactor;

measuring means for measuring, in particular, the temperatures of said coolant in order to provide firstly an overheating ratio representative of the ratio of a predetermined critical heat flux which would be severely damaging at whatever point it occurs in the core, to a real local heat flux at a hot point where said flux is at a maximum, and also to provide an average temperature of the coolant which should be close to a normal value in order to enable the station to operate optimally; and control rods provided with displacement means and with control means for inserting and extracting said rods longitudinally into corresponding zones of the core thereby controlling the positions of said rods, the position of a rod being defined by its extraction percentage, each of said rods including a neutron-absorbing material distributed along its length and conferring negative reactivity thereto which diminishes said neutron flux and said nuclear power in the corresponding zone of the core over the depth to which the rod is inserted in such a manner as to enable displacement of said rods to vary the nuclear power of the core at the expense of distortions which appear in the distribution of the neutron flux and which give rise to additional wear of the core, one family of these control rods being constituted by fine control rods capable of being displaced during normal control operations over a great height in order to cause the nuclear power to follow large variations which occur relatively infrequently in said external load, another family of the control rods being constituted by regulator rods, said rod control means receiving the average temperature of the coolant and reducing or increasing the extraction percentage of the regulator rods depending on whether said temperature is respectively greater than or less than its said normal value, thereby constituting a regulation loop which automatically maintains said average temperature in the vicinity of said normal value by causing the nuclear power to follow small variations which frequently affect said external load and which would cause said temperature to vary if the nuclear power were constant, said control means limiting the displacement of said regulation rods in normal operation to within a regulation range which is defined between two high extraction percentages so as to limit wear on the core by limiting the amplitudes of the distortions which such rod displacements frequently impose on the neutron flux;

said method comprising not only the displacement of the fine control rods during said normal control operations in order to cause the nuclear power to follow major changes in the external load, but also possible additional insertion of said rods during an operation to reduce power on an alarm which occurs as soon as said overheating ratio falls below a low alarm threshold such as to raise said ratio at least as far as said threshold, said threshold being determined with a safety margin sufficiently greater than unity to ensure that n being reached, said overheating cannot be approached in a dangerous manner, even in the event that certain accidents studied in advance may occur;

wherein different values for said low alarm threshold of the overheating ratio are chosen for different positions of the regulations rods within said regulation range, with a relatively high value being selected when the extraction percentage of said rods is relatively low, and a relatively low value being selected when the said percentage is relatively high, thereby avoiding a reduction of the nuclear power and thus of the power deliverable to said external load when the overheating ratio falls between said two threshold values while the positions of the regulation bars are such that in the event of one of said accidents being studied in advance occuring, a suitable displacement of said bars within said regulation range sufficing to avoid any risk of said overheating being approached in said dangerous manner.

2. A method according to claim 1, wherein a substantially linear and falling variation of the value of said low alarm threshold is selected as a function of the extraction percentage of said regulation rods, at least over a portion of said regulation range.

3. A method according to claim 2, wherein a substantially constant value of said low alarm threshold is selected over the bottom portion of said regulation range, and a value is selected which falls off substantially linearly over the upper portion of said range.

4. A device for performing the method of claim 1 for assistance in providing control, said device including a circuit for automatically determining the low alarm threshold of the overheating ratio, said circuit receiving data representative of the extraction percentage of said regulation rods, and providing a value for said alarm threshold which is a generally decreasing predetermined function of said percentage.

5. A method of determining a low alarm threshold of the overheating ratio of a nuclear reactor, wherein the higher the position of the temperature-regulating rods, the lower the value determined for said threshold.

* * * * *